Oct. 26, 1926.

J. B. FISHER 1,604,401

REDUCTION GEARING CONTROL

Filed May 28, 1925     3 Sheets-Sheet 2

Inventor:
James B. Fisher
by Brown, Boettcher + Dienner
Attys.

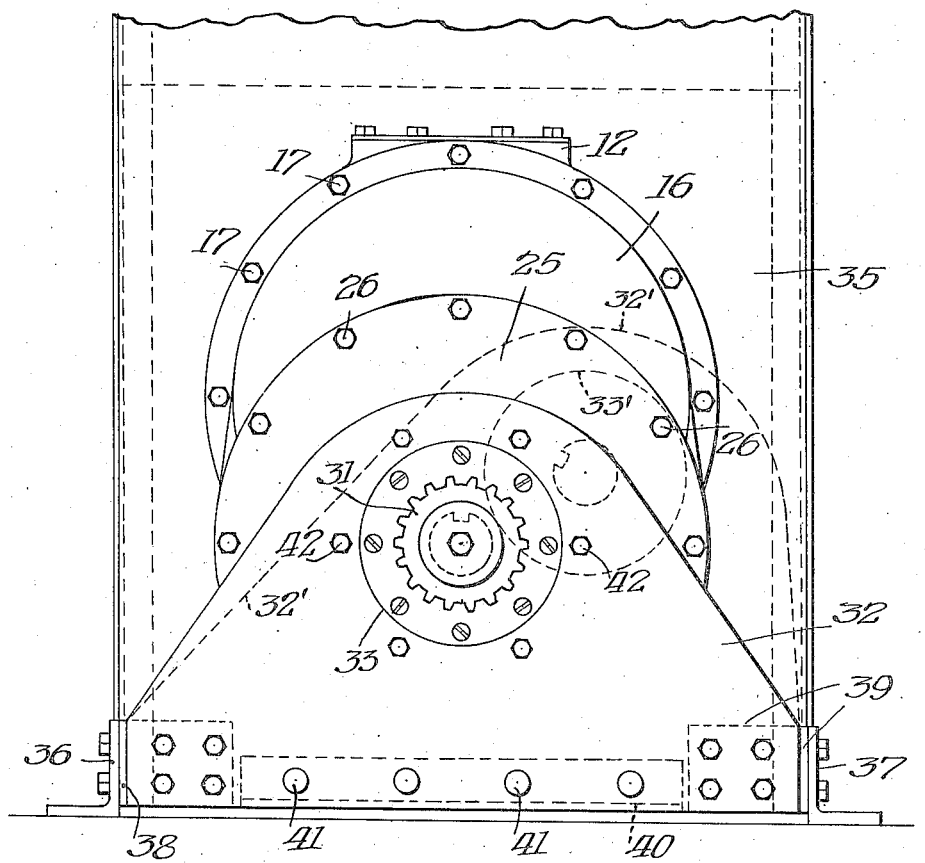

Patented Oct. 26, 1926.

1,604,401

UNITED STATES PATENT OFFICE.

JAMES B. FISHER, OF WAUKESHA, WISCONSIN, ASSIGNOR TO WAUKESHA MOTOR COMPANY, OF WAUKESHA, WISCONSIN, A CORPORATION OF WISCONSIN.

REDUCTION-GEARING CONTROL.

Application filed May 28, 1925. Serial No. 33,336.

My invention relates to internal combustion engines of the industrial type and particularly to improved arrangement, support and adjustment of reduction gearing forming part of the engine unit. With the industrial explosive engine motor reduction gearing is provided for reducing the speed. The reduction gearing usually comprises a counter or drive shaft carrying an internal gear with which meshes a pinion carried by the crank shaft of the engine, the outer end of the drive shaft terminating in a driving pinion or pulley for driving connection with apparatus to be driven. It is convenient, in many installations to be able to adjust the position of the drive shaft to bring the shaft in a more convenient position for meshing its drive pinion with adjoining gearing or to get clearance for other machinery, and I, therefore, provide an improved arrangement for swinging the drive shaft about the center line of the motor, which is the crank shaft axis, such swing of the reduction gearing giving considerable range of adjustment.

The object of the invention is to facilitate such adjustment and to strengthen the support of the reduction gearing train, particularly where it is subjected to the heaviest driving strains.

The above and other features of my invention are incorporated in the structure disclosed on the drawing, in which drawing—

Fig. 4 is an end elevational view showing the supporting frame work for strengthening the support of the reduction gearing.

Figure 1:
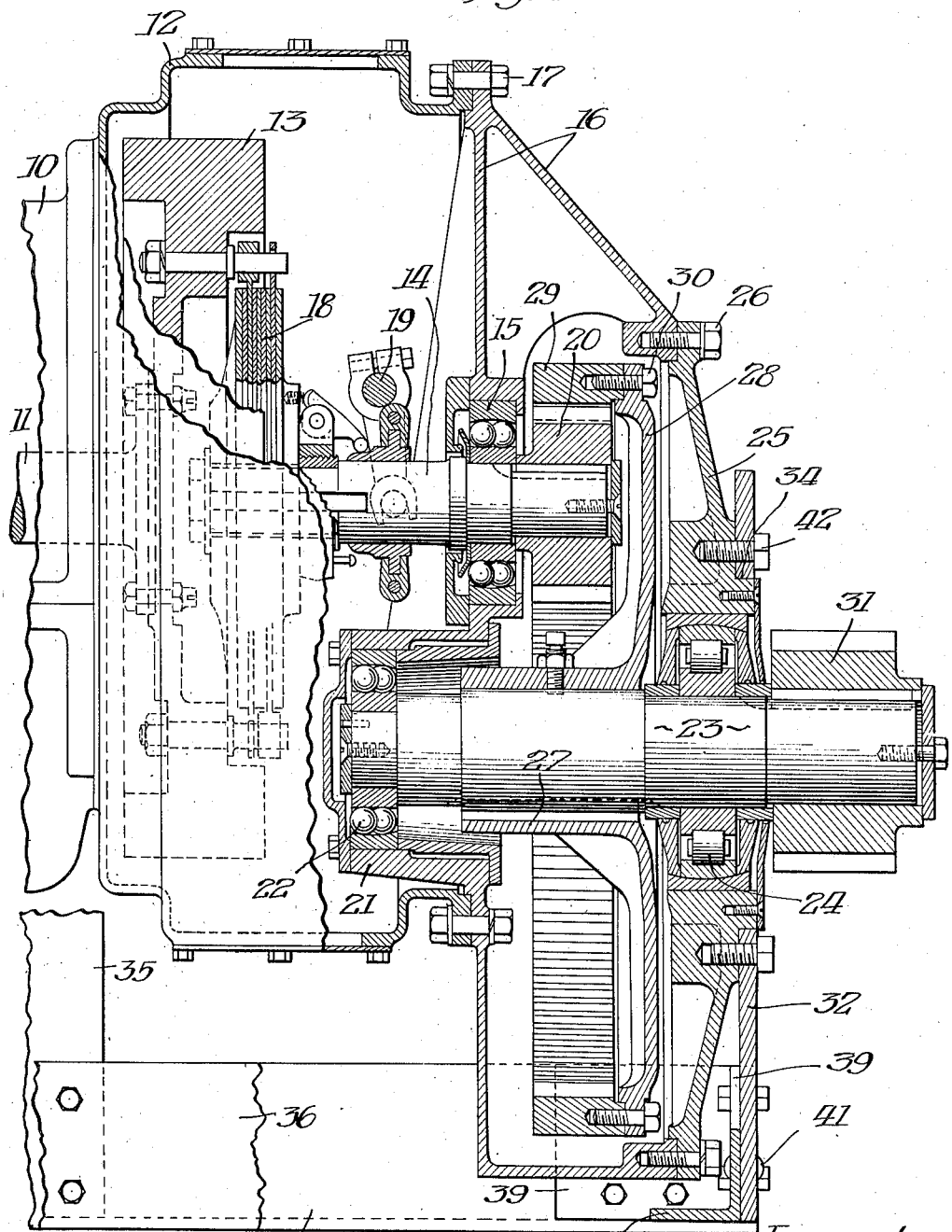
Figure 1 is a side elevational view partly in vertical diametral section of the driving end of an internal combustion engine.

On the drawing, 10 represents the main frame of the engine in which is journaled the crank shaft 11 which extends into the housing 12 in which it is secured to the fly wheel 13. The transmission shaft 14 extends coaxially with the crank shaft and at its outer end is journaled in the ball bearing structure 15 supported in the closure frame 16 which is detachably secured to the housing 12 by the bolts 17. Friction clutch mechanism 18 of any suitable construction serves to couple the transmission shaft to the crank shaft, and for the clutch mechanism the operating mechanism 19 is provided controlled by the lever 19'. Within the housing 16 and at its outer end, the transmission shaft 14 supports the transmission pinion 20.

The inner wall of the housing 16 has the inwardly extending annular wall 21 for supporting the ball bearing structure 22 which journals the inner end of the drive shaft 23 which extends parallel to the transmission shaft 14. At its outer end, the drive shaft is journaled in the roller bearing structure 24 supported in the end wall or closure plate 25 which is detachably secured to the outer side of the housing 16 by means of bolts 26.

Between the bearings, the drive shaft 23 has keyed thereto the hub 27 from whose outer end extends the circular disk 28 against whose inner side and concentric with the drive shaft is secured the annular gear 29 by means of screws 30, this annular gear being engaged by the transmission pinion 20. The pinion and annular gear form a reduction driving train between the transmission shaft 14 and the drive shaft 23 which terminates at its outer end in the drive pinion 31.

Figure 2:
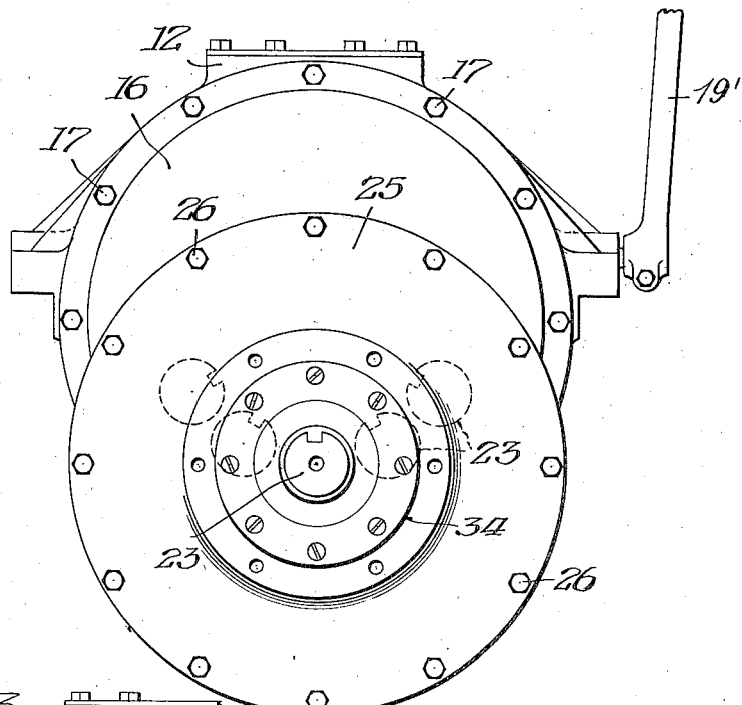
Fig. 2 is an end elevational view to reduced scale.

The housing 16 with its cover 25 forms a unitary frame which can be rotated around the transmission shaft 14 to swing the drive shaft 23 laterally to different positions. In the normal position, the drive shaft is vertically below the transmission shaft, as shown in Figure 2. With such normal position it is sometimes impossible or inconvenient to make proper connections between the drive pinion 31 and the apparatus to be driven, or to properly set the engine relative to other apparatus. However, by being able to swing the drive shaft through an arc, such obstacles can be readily overcome and convenient and efficient connections made with the drive pinion.

Figure 3:
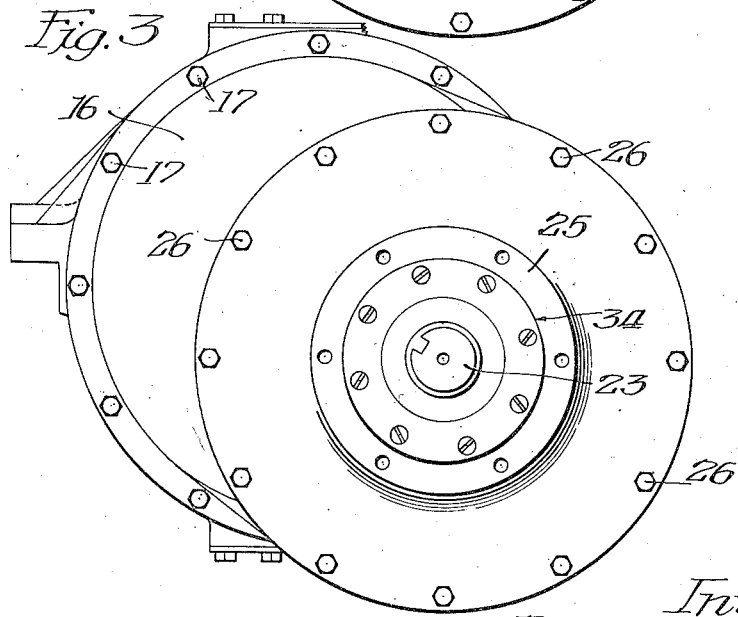
Fig. 3 is a similar end elevational view but showing a different position of adjustment of the drive shaft.

The seating surface between the housings 12 and 16 is finished so that the frame structure 16 can be readily and accurately rotated. In the arrangement shown on Figure 2, the bolts 17 are spaced 30 degrees apart so that the drive shaft 23 can be readily swung through 30 degree distances to either side. Such adjustment usually serves to bring the drive pinion in position for proper connections. However, under extraordinary conditions, finer and more accurate adjustment of the drive shaft can be made by drilling new bolt holes. Figure 3 shows the frame 16 rotated 60 degrees to swing the drive shaft 60 degrees to the right.

The frame structure 16 and 25 together with the gearing apparatus supported thereby has considerable weight, and the drive shaft is subjected to heavy strains, particularly at the outer bearing 24, when the engine is under load. An important object of my invention is, therefore, to relieve the engine main frame of the load of the end frame and contents and to strengthen the end frame structure and the gearing against stresses and strains. This can be accomplished by a wall or metal plate 32 provided with an opening 33 for receiving the shoulder 34 formed on the outer side of the end plate 25 preferably concentric with the drive shaft. The strengthening plate can be readily supported from the sub-structure which supports the frame and protecting covering for the engine. As shown in Figure 4, the housing or hood 35 is supported from longitudinally extending angle beams 36 and 37, and for the support of the strengthening plate 32, these beams may be extended below the frame work 16 and the plates rigidly secured thereto by means of angle brackets 38 and 39 having one leg bolted to the angle beams and their other legs bolted to the plate 32 at the lower corners thereof as clearly shown in Figures 1 and 4. Between the angle brackets the plate 32 can be further supported and stiffened by means of an angle bar 40 secured thereto by rivets 41. The plate is detachably secured to the end wall or cover 25 by means of screws 42.

The opening 33 in the strengthening and supporting plates 32 is located in accordance with the adjustment of the reduction gearing. In Figures 1 and 4, the drive shaft is vertically below the transmission shaft 14 and the opening 33 is located in the middle line of the plate 32. For the adjusted arrangement shown in Figure 3, the opening will be formed at one side of the plate as indicated by the dotted line 33' (Figure 4). The rigidly supported plate, being intimately secured to the housing structures 16 around the shoulder 34, will take up a considerable part of the weight of the housing structures and the contained gearing and other parts and will also keep the drive shaft properly alined and strengthen its bearing support against strain and load when the engine is working.

I thus provide simple and efficient means for readily and accurately adjusting the driving shaft of the reduction gearing in an engine or motor structure, and for giving a stiff and rigid support at the point where the heaviest load is applied to the driving shaft and in supporting frame work.

I claim, as follows:

1. In a motor, the combination of the motor frame, a shaft driven by the motor, a drive shaft parallel with said motor driven shaft, a transmission train between said shafts, an end frame journaling said drive shaft and enclosing said transmission train, a sub-structure on which said motor frame is supported, and a supporting wall between said sub-structure and the outer end of said end frame for supporting said end frame.

2. In a motor, the combination of the motor main frame, a shaft driven by the motor, a housing extending from the motor frame and enclosing said shaft, a drive shaft parallel with said motor driven shaft, a transmission train connecting said shafts, an end frame journaling said drive shaft and enclosing said transmission train, a sub-structure for supporting said motor frame, and a supporting member secured to said sub-structure and secured to the outer end of said end frame.

3. In a motor, the combination of the motor main frame, a shaft driven by the motor, a housing extending from the motor frame and enclosing said shaft, a drive shaft, a transmission train connecting said shafts, an end frame journaling said drive shaft and enclosing said transmission train, a sub-structure supporting said motor frame, said end frame having an annular shoulder on its outer side, and a plate having an opening receiving said shoulder and secured to said sub-structure and to said end frame.

4. In a motor, the combination of the motor frame, a shaft driven by said motor, a housing extending from the motor frame and enclosing said shaft, a drive shaft parallel with said motor driven shaft, a transmission train connecting said shafts, an end frame having inner and outer bearing for supporting said drive shaft, said frame enclosing said transmission train, said frame being rotatable on said housing on the axis of said motor driven shaft whereby said shafts may be relatively adjusted, and a supporting wall detachably secured to said end frame around the outer bearing of said drive shaft.

5. In an industrial internal combustion engine, the combination of the engine main frame, a crank shaft journaled therein, a housing extending from said main frame, a transmission shaft in said housing and means for coupling it to the crank shaft, an end frame having outer and inner walls, said transmission shaft being journaled at its outer end in the inner walls of said end frame, a drive shaft journaled on the inner and outer walls of said end frame, a transmission train within said end frame connecting said shafts, a driving member on the outer end of said drive shaft, a supporting sub-structure for said engine frame, and a metal plate extending from said sub-structure and secured to the outer wall of said end frame around the outer bearing of said drive shaft.

6. In an industrial internal combustion engine, the combination of the engine frame, a crank shaft journaled in said frame, a fly wheel secured to the end of said shaft, a housing extending from the end frame and enclosing said fly wheel, a transmission shaft within said housing and means for coupling it to the crank shaft, an end frame having inner and outer walls and detachably secured to said fly wheel housing, a drive shaft having bearing support in the inner and outer walls of said end housing, a transmission train within said end housing connecting said shafts, a driving member on the outer end of said drive shaft, a sub-structure for supporting the motor frame, and a metal plate detachably secured to said sub-structure and to the outer wall of said end frame, said plate having an opening and said end wall being shaped to fit into said opening.

7. In a motor, the combination of the main frame, a housing extending from said frame, a shaft within said housing, driven by said motor, an end frame detachably secured to said housing, a drive shaft journaled in said end frame, a transmission train within said end frame connecting said shafts, said end frame being rotatable on the axis of said motor driven shaft whereby said shafts may be relatively adjusted, supporting means for the motor frame, said means extending under said end frame, and a metal plate detachably secured to said means and to the outer side of said end frame, said plate having an opening and said frame end being shaped to fit into said opening.

In witness whereof, I hereunto subscribe my name this 22 day of May, 1925.

JAMES B. FISHER.